United States Patent
Bates

[11] Patent Number: 6,003,300
[45] Date of Patent: Dec. 21, 1999

[54] TECHNIQUE FOR HIGH MIXING RATE, LOW LOSS SUPERSONIC COMBUSTION WITH SOLID HYDROGEN AND LIQUID HELIUM FUEL

[75] Inventor: Stephen C. Bates, P.O. Box 1310, Glastonbury, Conn. 06033

[73] Assignee: Stephen C. Bates, Glastonbury, Conn.

[21] Appl. No.: 08/786,673

[22] Filed: Jan. 21, 1997

[51] Int. Cl.$^6$ ................................ F02K 7/08; F17C 5/04
[52] U.S. Cl. .................. 60/204; 60/270.1; 60/39.464; 62/7; 62/54.1
[58] Field of Search .................. 60/251, 270.1, 60/39.464, 39.465, 204; 62/7, 54.1, 46.1, 46.2; 149/1

[56] References Cited

U.S. PATENT DOCUMENTS

| | | | |
|---|---|---|---|
| 3,354,662 | 11/1967 | Daunt | 62/10 |
| 3,393,152 | 7/1968 | Smith et al. | 62/46.1 |
| 3,416,977 | 12/1968 | Rein | 62/46.1 |
| 3,470,040 | 9/1969 | Tarpley, Jr. | 149/1 |
| 3,519,879 | 7/1970 | Paine | 149/1 |
| 3,521,458 | 7/1970 | Huibers et al. | 62/45 |
| 5,154,062 | 10/1992 | Gaumer, Jr. et al. | 62/54.1 |
| 5,168,710 | 12/1992 | Miyazaki | 62/54.1 |
| 5,214,914 | 6/1993 | Bilig et al. | 60/270.1 |
| 5,220,801 | 6/1993 | Butler et al. | 62/54.1 |
| 5,301,510 | 4/1994 | Glasser | 62/54.1 |
| 5,705,771 | 1/1998 | Flynn et al. | 62/10 |

OTHER PUBLICATIONS

Elrod, Charles, "Hydrogen Subcooling for Aerospace Vehicles", IEEE Transactions on Aerospace–Support Conference Proceedings, pp. 864–876, Aug. 1963.

*Primary Examiner*—Ted Kim

[57] ABSTRACT

This invention relates to a fueling process that allows complete combustion with air in the combustor of an aircraft traveling at a speed greater than the speed of sound. A process is described to inject a jet of solid hydrogen particles admixed in liquid helium through the combustor wall to achieve extremely rapid mixing of hydrogen throughout the supersonic airstream of the combustor of a high speed vehicle. Mixing on a molecular scale is so rapid that complete and efficient combustion occurs within the combustor.

8 Claims, 3 Drawing Sheets

TECHNIQUE FOR HIGH MIXING RATE, LOW LOSS SUPERSONIC COMBUSTION WITH SOLID HYDROGEN AND LIQUID HELIUM FUEL

CROSS-REFERENCES TO RELATED APPLICATIONS

1) U.S. Pat. No. 5,705,771 Jan. 6, 1998, Flynn et. al., "Cryogenic Propellants and Method For Producing Cryogenic Propellants"

2) U.S. Pat. No. 5,301,510 Apr. 12, 1994, Glasser, "Self-Powered Slush Maintenance Unit"

3) U.S. Pat. No. 5,220,801 Jun. 22, 1993, Butler et al., "Method and Apparatus for Maintenance of Slush Mixture at Desired Level During Melt Conditions"

4) U.S. Pat. No. 5,214,914 Jun. 1, 1993, Billig et al., "Translating Cowl Inlet with Retractable Propellant Injection Struts"

5) U.S. Pat. No. 5,168,710 Dec. 8, 1992, Miyazaki, "Slush Hydrogen Production Apparatus"

6) U.S. Pat. No. 5,154,062 Oct. 13, 1992, Gaumer, Jr. et al., "Continuous Process for Producing Slush Hydrogen"

7) U.S. Pat. No. 3,521,458 Jul. 21, 1970, Huibers et al., "Apparatus for Making Hydrogen Slush Using Helium Refrigerant"

8) U.S. Pat. No. 3,516,879 Jun. 23, 1970, Rein, "Process of Forming Particles in a Cryogenic Path"

9) U.S. Pat. No. 3,470,040 Sept. 30, 1969, Tarpley, Jr., "Thixotropic Liquid Propellant Compositions with Solid Storage Characteristics"

10) U.S. Pat. No. 3,416,977 Dec. 17, 1968, Rein, "Cryogenic Cooling"

11) U.S. Pat. No. 3,393,152 Jul. 16, 1968, Smith et.al., "Composition of Matter and Methods of Making Same"

12) U.S. Pat. No. 3,354,662 Nov. 28, 1967, Daunt, "Dynamic Flash Production of Hydrogen Slush"

STATEMENT AS TO RIGHTS TO INVENTIONS MADE UNDER FEDERAL-SPONSORED RESEARCH AND DEVELOPMENT.

This invention was made not made under Federal-sponsored research. All rights reside with the inventor.

BACKGROUND OF THE INVENTION

FIELD OF THE INVENTION

This invention relates to combustion with air in an aircraft traveling at a speed greater than the speed of sound, and more particularly to an apparatus to provide fueling for the combustor in this aircraft.

Efficient propulsion of aircraft must use engines that capture air in the atmosphere, mix this air with fuel, and burn the resulting mixture for thrust to move the aircraft forward. Subsonic combustors are not practical as supersonic (faster than the speed of sound) or hypersonic (much faster than the speed of sound) combustors because of the shock losses that result from having to slow the incoming air stream in order to complete combustion. Scramjets, or supersonic combustion ramjets, however, rely on increasing combustion pressure, and thus combustion efficiency, by slowing the incoming air to lower supersonic speeds. Current scramjet designs all use some form of supersonic combustion, and they all must solve the fundamental problems of this type of combustion, which are: 1) a low residence time in the combustor for fuel distribution and mixing, 2) the large aerodynamic losses caused by structures protruding into the flow, and 3) the low fraction of combustion energy relative to exhaust kinetic energy. The most difficult problem of supersonic combustion is to perform both mixing and full reaction during the very short residence time of the fuel in the combustor.

2. Description of the Related Art

It is one object of the present invention to decrease the time which is taken to mix all of the fuel and air on a molecular length scale so that complete combustion can take place.

Heretofore, using liquid injection of fuel it has been difficult to achieve vaporization of the liquid droplets, followed by gas mixing of this vapor with the surrounding air so that complete, molecular-scale mixing and combustion can take place inside the combustor. If the fuel droplets are small enough to vaporize quickly, they are carried along with the flow and because there is little relative velocity between the vaporizing droplet and the surrounding flow, there is no driving force for mixing the air with the vapor fuel except by molecular diffusion, which is very slow compared with fluid dynamic mixing. If the fuel droplets are large and a relative velocity can be maintained with respect to the surrounding air to promote mixing, a large amount of heat is required to vaporize the droplets and fuel vapor is formed at a relatively slow rate compared with the same mass of fuel dispersed in smaller droplets. Thus for either large or small liquid droplets of fuel the final mixing of fuel and air on a molecular scale necessary for combustion is a slow process compared with the time scales appropriate to flow through a supersonic combustor.

It is another object of the present invention to provide a method by which the fuel can be spread across the full extent of the combustor by injecting relatively large particles of fuel at high velocity through a wall that forms a side of the combustor or combustor inlet without protrusions from this wall.

Heretofore, using liquid injection of fuel it has been difficult to penetrate the supersonic airstream in the combustor to spread the fuel across the full extent of the combustor. In the presence of the high shear forces of supersonic flows, liquid fuel jets rapidly break up into tiny droplets that are then carried downstream with the flow before travelling very far across the flow duct. This problem has been overcome in the past by adding protrusions into the flow that are distributed over the inlet area from which fuel has been injected and can then completely fill the airstream. These protrusions cause a significant decrease in overall combustion efficiency because of the fluid mechanical losses that result from the shock waves that are caused by the protrusions.

Hydrogen fuel can be stored on the aircraft with a higher density than liquid hydrogen and yet be pumped with standard pumps as a stable slurry. Past art has utilized solid hydrogen slush extensively, but not commercially, for this purpose. Heretofore solid hydrogen has not been used as a fuel because of added cooling costs and because there has been no practical means of efficiently transporting it to and into the combustor. Solid hydrogen is preferable to liquid hydrogen because the same amount of material can be carried in the aircraft in a significantly smaller volume, decreasing the necessary size of the aircraft and decreasing the structure and structural weight needed to contain the fuel. Storing hydrogen as a solid is also a means for stabilizing energetic materials which would otherwise diffuse and react in a liquid fuel.

It is another object of the present invention to provide a separate motivation and means for using solid hydrogen for supersonic combustion with the understanding that solid hydrogen provides a method for freezing highly energetic materials in a stable state so that these energetic materials can be used to increase the energy of the fuel when mixing into the solid hydrogen. Normally solid or liquid hydrogen is gasified to absorb high-speed skin friction heating, rather than being injected into the combustor as a liquid or solid.

SUMMARY OF THE INVENTION

A method is described to achieve the wall injection and mixing of hydrogen throughout the supersonic airstream of the combustor of a high speed vehicle to achieve rapid and efficient complete combustion within the combustor.

DESCRIPTION OF PREFERRED EMBODIMENTS

Figure 1:
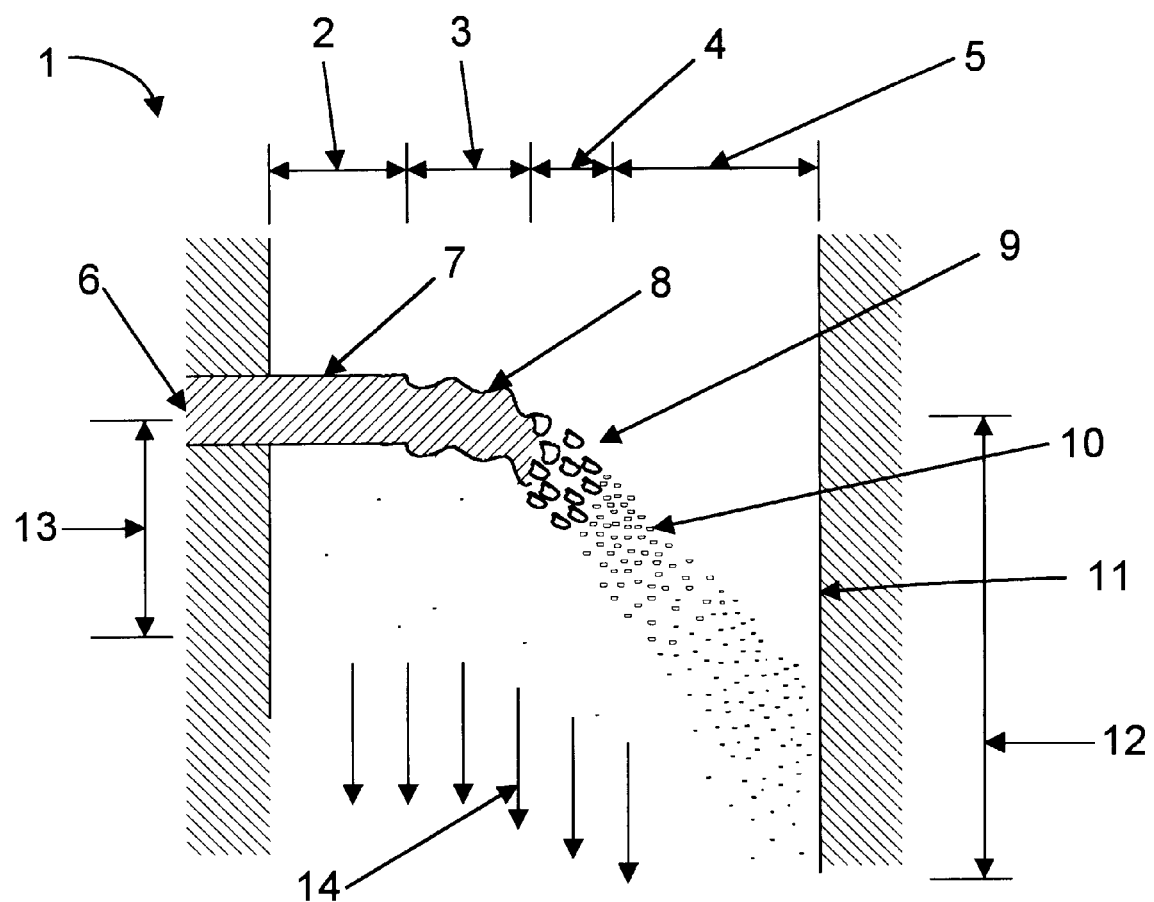
FIG. 1 shows a schematic of injection of a particle jet into a supersonic flow.

A schematic 1 of the injection of a solid hydrogen particle jet into a supersonic flow is illustrated in FIG. 1. This figure illustrates the behavior of one fueling jet as it breaks up into smaller and smaller segments, eventually dispersing into individual particles in the jet over a large volume. The jet is characterized by a diameter, a velocity, and the properties of the fluid that is injected. The fluid is injected through a tube 6 and enters the supersonic airstream 14 as a column of liquid 7. The jet column 7 quickly develops wave instabilities 8 on its surface that grow rapidly and lead to breakup of the jet into clumps 9 and then into small droplets 10. These processes have characteristic lengths 2, 3, 4, and 5 that are multiples of the jet diameter; the characteristic lengths are determined by the jet and free stream properties. The total length of penetration for a liquid jet is significantly less than the total width of a standard supersonic combustor, and the jet breaks up quickly into small droplets. A particle jet penetrates much farther than a liquid jet into the flow and breaks into agglomerations of particles of varying size 9 which continue to move across the flow, decreasing in size, and ending in a cloud of individual particles 10 that then ablate. The jet breakup process occurs over a length 13 in the direction of the flow, and total evaporation occurs over a longer total length. The liquid and gas that is ablated from the particles are mixed and combusted within the combustor as a final result of the ablation process. FIG. 1 shows how the fuel jet would penetrate the entire duct. For jet development as shown, most of the mixing would take place at the far end of the jet. Other jet geometries would be used for combustor fueling closer to the injector.

Figure 2:
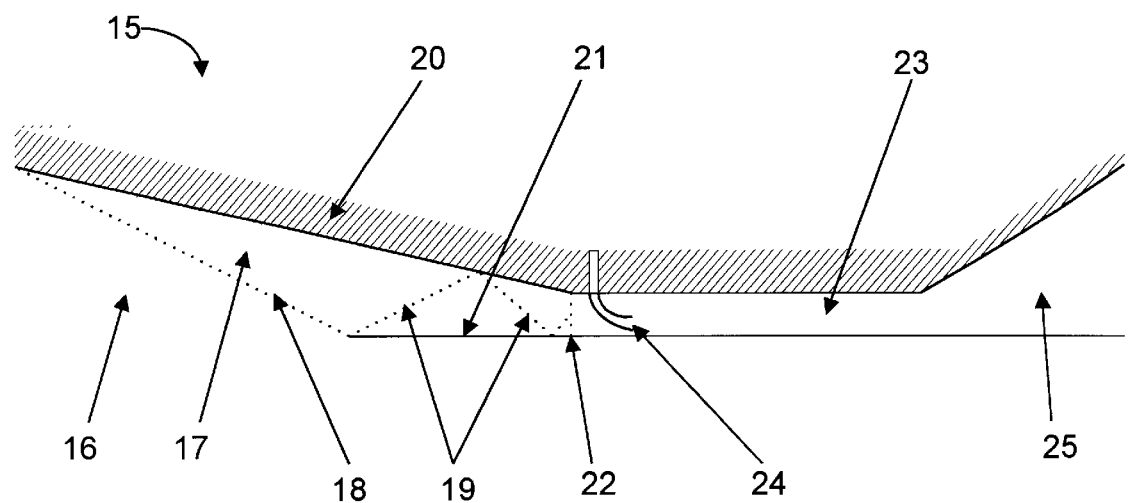
FIG. 2 shows a schematic of a typical scramjet combustor geometry.

FIG. 2 shows a schematic of a typical scramjet combustor geometry 15. The combustor flows are contained by an aircraft body 20 and outer faring 21. The history of the air entering the combustor 16 begins when the aircraft body causes a shock wave 18 that compresses the air in front of the combustor. A series of shock waves occur 19 before the air reaches the combustor throat 22. Fuel 24 may be injected into the combustor itself 23 or upstream of the combustion throat 20. The combustor 23 usually has about a 10 to 1 aspect ratio. The time needed to cross a 1.0 meter (m) wide combustor will be on the order of 10 milliseconds for perpendicular injection at 100 m/s transverse velocity across the duct. In this period of time the solid particles of the jet 24 must disperse and ablate. The ablation time and distance of a specific particle jet can be controlled by changing the particle size if the particles are large enough not to be swept downstream by aerodynamic drag and out the end of the combustor 25.

Figure 3:
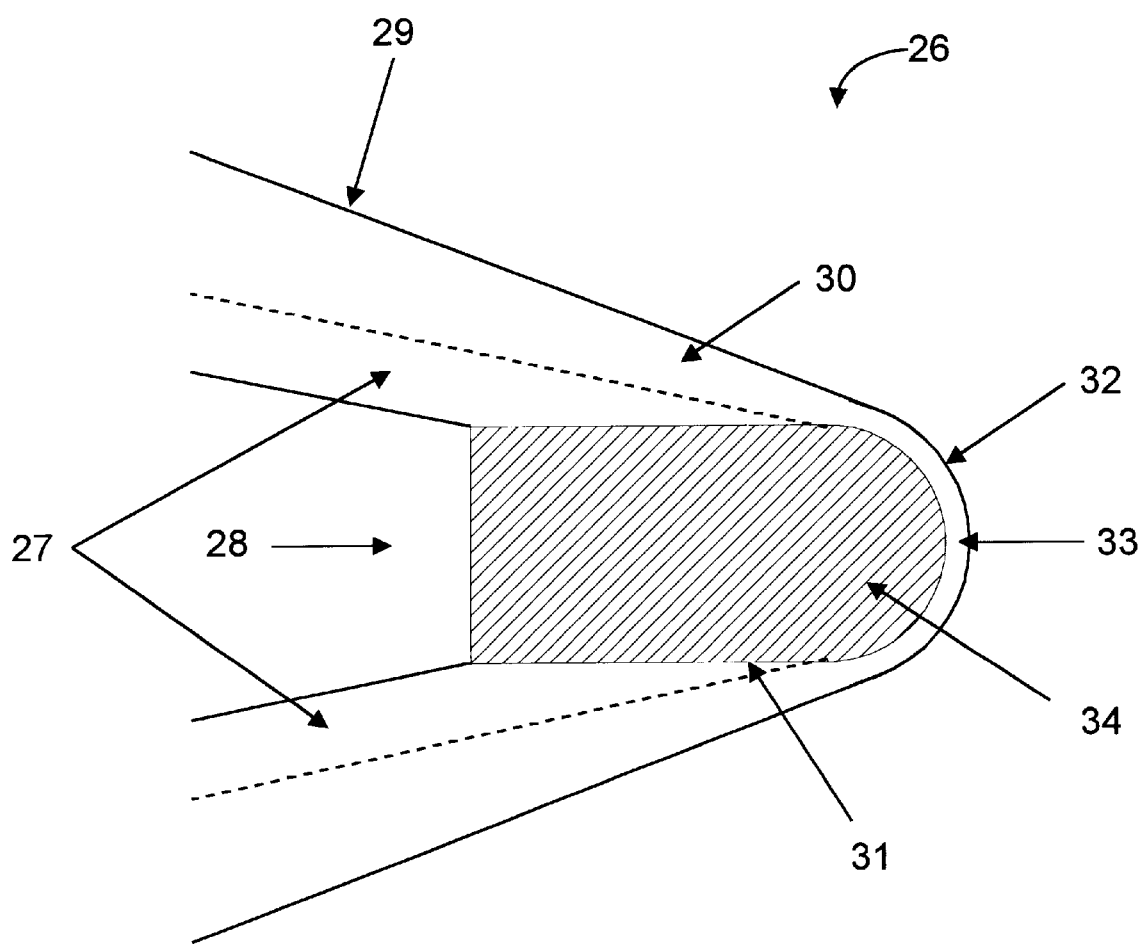
FIG. 3 shows a schematic of a side-view cross section of flow past a solid hydrogen pellet.

FIG. 3 shows a schematic 26 of a side-view cross section of flow past a solid hydrogen pellet. Hydrogen particle ablation is a problem in fluid dynamics where there is simultaneous mass, momentum and energy transport of two species occurring in the presence of phase changes of both species. The problem is described by the Navier-Stokes fluid flow equations that include the volume between the surface of the particle and the undisturbed combustion gas. The gas and liquid flows near the particle are described primarily as boundary layer flows, but gas is continually evolved from the particle. Boundary conditions of the flow include a high temperature shock-heated free stream flow for relative particle velocities greater than the local speed of sound, and a solid particle at a temperature of 10 degrees Kelvin. For this specific problem there is also a boundary condition internal to the flow that the combustion gas condenses at some position in the cold hydrogen gas layer and provides a mechanism by which there is a net flow of gas from the free stream toward the particle.

The solid hydrogen particle jet moves through high temperature, shock heated air in the combustor 23. For particles injected into a supersonic flow there will be a shock wave 32 in front of the particle. The high temperature and pressure zone 33 just behind the shock will be a dominating effect, compressing the gas in front of the particle 34 and increasing heat transfer locally there. The size and shape of the shock 32 may also to some extent be determined by the amount of gas coming off of the particle, rather than the size of the particle 34 itself. The solid particle 34 has a liquid layer 31 on its surface, and it is this liquid layer 31 that evolves gas while at the same time some liquid flows around the particle 34 and is shed into the flow 27 and 28. Behind the particle is a wake 28 that consists of both hydrogen liquid droplets and hydrogen gas. Beside the particle is an oblique shock wave 29, behind which is a turned unmixed flow 30, and behind the unmixed flow is a mixing zone 27 where the hydrogen and air combine.

The major controlling factors for solid hydrogen ablation are the heat transfer to the particle, and the mass flow from the particle. The heat from the free stream gas melts the solid and vaporizes the liquid. This heat input arises from a combination of heat conduction and convection (radiation is negligible), as well as condensation and possibly solidification of the free stream gas as a result of the extremely low temperature of the hydrogen near the particle and the relatively high condensation temperature of the combustion gas. Vaporization of hydrogen liquid causes a hydrogen gas layer to be created around the particle that partially shields the particle from the diffusing mass, momentum, and energy diffusion from the combustion gas. There is thus a stable equilibrium that is created between the heat flux to the liquid surface and the thickness of the shielding gas layer. If the layer thickens, the heat input decreases, less gas is evolved, and the layer thins, increasing the heat input back to its equilibrium level. The hydrogen gas wake shields the sides and back of the particle from condensation and heat transfer, so that ablation takes place primarily from the front and sides of the particle. The particles also may tumble as they encounter buffeting from the surrounding gas.

The particle loses mass through vaporization of liquid at its surface and entrainment of the liquid in the gas that flows around the particle. Liquid entrainment significantly reduces the heat input necessary for particle ablation because the heat of vaporization is so much larger that the heat of fusion, and mass lost from the particle by liquid shedding does not need to first be vaporized from the particle. The particle velocity will dominate the ablation process. The speed of the particle determines the large-scale thickness of the gas layer, as well as the shear forces on the particle surface that result in liquid entrainment. The case of a fuel jet into a combustor is much more complex than that shown in FIG. 3, since in the figure the pellet ablates with a single normal shock system in front of it, whereas an injected jet of particles undergoes some complex break-up process in multiple shocks into supersonic cross flow.

Injection of a fuel consisting of solid hydrogen particles in liquid helium provides a superior technique for supersonic combustion. Particulate solid hydrogen fueling has the following critical advantages: 1) the solid particles can penetrate the full width of the supersonic flow in the combustor, 2) hydrogen ablation consisting of liquid and gas shedding from the solid hydrogen particles dispersed in the flow results in extremely fast volumetric mixing of the fuel. The unique physical properties of solid and liquid hydrogen are the cause of the extremely fast particle ablation. The low temperature of solid hydrogen (4–10 K) causes condensation of air near the solid, in turn causing a large heat release for ablation near the particle that does not occur for any other ablating material. Furthermore, the surface tension of hydrogen liquid is so low that liquid entrainment contributes to mass loss from the particles, rather than just vaporization, significantly lessening the heating required for ablation, and the time for ablation given a fixed heat transfer rate. The entrainment of widely dispersed hydrogen wakes from the small ablating particles in the fuel jet provides rapid volumetric mixing with the air as the particles pass through the combustor volume. Another advantage of solid hydrogen fueling is the potential for it to act as a stabilizing host to other materials such as high energy materials, oxygen, or a catalyst that is used to reduce recombination in the combustion products and increase combustion efficiency. The particles in the jet are sized to fully ablate across the combustor.

The two problems addressed by this fueling method are the ability to spread the fuel across the supersonic flow, and to mix it on a molecular scale for combustion so that it can provide thrust before exiting the combustor. The solid hydrogen particles provide penetration of a supersonic airflow that is not possible with liquid injection. The uniquely high ablation rate of solid hydrogen in air and the full dispersion of the solid hydrogen particles provide the rapid volumetric mixing required for supersonic combustion.

The critical difference between injection of liquid and solid particles is that liquid injection leads quickly to droplet atomization and liquid scales that are so small that they quickly lose transverse velocity in the flow; this is not true for solid particles.

The embodiments of the invention described herein are the best known current uses of the invention and are described by way of illustration. The scope of the invention is set forth in the appended claims, as it is desired to protect all uses of the invention apparent to those skilled in the art in addition to those described herein.

What is claimed is:

1. A process of operating a supersonic combustion system of a flying vehicle having a supersonic velocity combustor receiving a supersonic airstream, the airstream and combustor respectively having a width and a length, the process comprising the following steps:

a) injecting a fuel comprising liquid helium admixed with particles of solid hydrogen through an aperture located either in a wall of the supersonic velocity combustor or in a wall upstream of the combustor using a fuel injection system, b) the injected fuel penetrating over most of the width of the supersonic airstream in the combustor as a jet of solid hydrogen particles;

c) said hydrogen particles ablating to hydrogen gas totally within the length of the combustor as a result of their fluid dynamic interaction with the supersonic airstream in the combustion chamber;

d) said hydrogen gas mixing with the supersonic air and burning within the combustor in a continuous flame.

2. A process as in claim 1 and in which, the fuel has a total fuel volume, where a largest volume fraction of the fuel volume is made up of separate solid hydrogen particles which are less than 10 cm in diameter and greater than $10\,\mu$ in diameter.

3. A process as in claim 1 and in which, the fuel has a total fuel volume, a volume fraction of liquid helium is less than 20% of the total fuel volume.

4. A process as in claim 1 and in which, the fuel contains other materials mixed into it to improve the combustion process.

5. A process as in claim 1 and in which, the fuel contain other solid components separate from the solid hydrogen.

6. A process as in claim 1 and in which, the fuel is held at any temperature between zero degrees Kelvin and the boiling temperature of helium at 1000 atmospheres pressure.

7. A process as in claim 1 and in which, the fuel is injected into the airstream at a speed greater than 10 meters per second.

8. A process as in claim 1 and in which, the fuel is injected in any number of separate streams into the airstream entering the combustor.

* * * * *